(12) United States Patent
Mauritz et al.

(10) Patent No.: US 7,770,086 B2
(45) Date of Patent: Aug. 3, 2010

(54) DETECTION METHOD FOR ACK/NACK SIGNALS AND DETECTOR THEREOF

(75) Inventors: Oskar Mauritz, Stockholm (SE); Branislav Popovic, Stockholm (SE)

(73) Assignee: Huawei Technologies Co., Ltd., Shenzen (CN)

( * ) Notice: Subject to any disclaimer, the term of this patent is extended or adjusted under 35 U.S.C. 154(b) by 316 days.

(21) Appl. No.: 12/045,084

(22) Filed: Mar. 10, 2008

(65) Prior Publication Data
US 2008/0155371 A1 Jun. 26, 2008

Related U.S. Application Data

(63) Continuation of application No. PCT/CN2005/001434, filed on Sep. 8, 2005.

(51) Int. Cl.
*H04L 1/18* (2006.01)
*G08C 25/02* (2006.01)
(52) U.S. Cl. .................. 714/748; 375/349; 370/342
(58) Field of Classification Search ......... 714/748–749; 375/349; 370/342
See application file for complete search history.

(56) References Cited

U.S. PATENT DOCUMENTS

2006/0072691 A1* 4/2006 Kent et al. .................. 375/349

2007/0015476 A1* 1/2007 Akbar Attar et al. ..... 455/127.1

FOREIGN PATENT DOCUMENTS

| EP | 1326361 | 7/2003 |
|---|---|---|
| EP | 1526673 | 4/2005 |
| WO | 0217513 | 2/2002 |
| WO | WO-2005055485 | 6/2005 |

* cited by examiner

*Primary Examiner*—Guy J Lamarre
(74) *Attorney, Agent, or Firm*—Slater & Matsil, L.L.P.

(57) ABSTRACT

A detection method for ACK/NACK includes the steps of: (a) calculating a threshold between ACK and DTX, which includes two values, the first being proportional to a noise standard deviation after despreading the received signal, and the second depending on an estimated received signal for ACK, (b) calculating a threshold between NACK and DTX, which includes two values, the first being proportional to a noise standard deviation after despreading the received signal, and the second depending on an estimated received signal for NACK, (c) selecting the threshold with maximum absolute value from the two calculated values of the threshold between ACK and DTX, (d) selecting the one with maximum absolute value from the two calculated values of the threshold between NACK and DTX, and (e) comparing a decision variable with the two selected thresholds. An ACK/NACK detector includes a threshold generating unit used for selecting the threshold with maximum absolute value from the two calculated values of the threshold between ACK and DTX, and the threshold between NACK and DTX, respectively.

12 Claims, 3 Drawing Sheets

DETECTION METHOD FOR ACK/NACK SIGNALS AND DETECTOR THEREOF

CROSS-REFERENCE TO RELATED APPLICATIONS

The present application is a continuation of PCT Application No. PCT/CN2005/001434 filed on Sep. 8, 2005, which is incorporated herein by reference in its entirety.

FIELD OF THE INVENTION

The present invention relates to the field of digital radio communication, and in particular to a selective threshold ACK/NACK detector and method thereof.

BACKGROUND OF THE INVENTION

The evolution of the third generation mobile communication systems includes higher data rates and packet oriented modes. High Speed Downlink Packet Access (HSDPA) is a new feature in WCDMA that improves throughput in the system and increases the maximum data rate for a single user. HSDPA is a packet data transmission system, where the base station schedules and transmits data packets to different Mobile Stations (MSs).

An important component to prevent from losing data packets in HSDPA is the Hybrid Automatic Repeat Request (Hybrid ARQ). The data packets are preceded by indicators that inform the receiving MS about transmission time and other characteristics of the transmission. For each packet that the MS receives, the MS transmits an acknowledgement (ACK) signal if the packet has been received correctly and a negative acknowledgement (NACK) signal if the packet was received but not correctly. It may happen that the MS does not detect an indicator signal from the base station. In that case the MS is not able to receive the data packet, and will apply discontinuous transmission (DTX), i.e. the MS will not transmit any signal at all. In other words, the MS only transmits ACK/NACK signals when it has received a packet, otherwise there is no signal transmitted.

The transmitted signals, ACK and NACK, are antipodal signals. In parallel with the ACK/NACK signal there is a pilot signal that can be used for channel estimation. The network specifies power offsets $\Delta P_a$ and $\Delta P_n$ for ACK/NACK transmissions, respectively. These power offsets are relative to the power for the pilot signal. The channel estimation and the known power offsets give the estimated received signal powers for ACK and NACK in case there was an ACK or NACK transmission. Thus the received signal powers and amplitudes of ACK and NACK transmissions can be estimated by the receiver.

When the base station tries to receive the ACK/NACK, there are three different possibilities: ACK, NACK, or DTX has been transmitted. Table 1 lists the target performance requirements on the physical layer that have been outlined in the 3GPP for the ACK/NACK detection. The requirements are given in the form of probabilities of erroneous detection that the physical layer should not exceed. The ability of the physical layer to fulfill the requirements depends on the ACK/NACK detector as well as the power offsets $\Delta P_a$ and $\Delta P_n$ for ACK and NACK transmission, respectively, which are specified by the network. In table 1, the notation P(DTX|ACK) represents the probability of detecting DTX signal when ACK signal is transmitted. It is similar for P(ACK|NACK) and P(ACK|DTX).

TABLE 1

Target performance requirements on ACK/NACK reception

| Conditional probability: P(Detected\|Transmitted) | Propagation channel | |
|---|---|---|
| | Case1/Case2 | Case3 |
| P(NACK or DTX \| ACK) | $\leq 10^{-2}$ | |
| P(ACK \| NACK) | $\leq 10^{-4}$ | $\leq 10^{-3}$ |
| P(ACK \| DTX) | $\leq 10^{-2}$ | $\leq 10^{-1}$ |

Two ACK/NACK detectors have been proposed, the Constant False Alarm Rate (CFAR) detector, and a dynamic threshold detector. A CFAR detector was presented in "Simulation conditions for HS-DPCCH (ACK/NACK) detection performance," R4-030928, 3GPP, November 2003, and "Energy requirements for UL ACK/NACK signaling under different sets of constraints", R1-02-0420, 3GPP, February 2002. The dynamic threshold detector was presented in "On the decision threshold for detecting ACK/NACK messages," R1-02-0823, 3GPP, May 2002.

The CFAR detector ensures a constant erroneous detection probability of ACK and NACK when no signal has been transmitted i.e. DTX condition, regardless of the noise power. This is achieved by having an adaptive detection threshold proportional to the noise standard deviation. For a CFAR detector of ACK/NACK, two such adaptive thresholds are needed: $T_a$, which is negative, between "ACK" and "DTX", in case of negative signs for ACK and $T_n$, which is positive, between "DTX" and "NACK", in case of positive signs for NACK. It is shown in FIG. 1a. A decision variable z can be obtained by means of accumulating outputs of Rake combiner. If a decision variable z is less than the threshold $T_a$, the decision is ACK; if a decision variable is greater than threshold $T_n$, the decision is NACK; if a decision variable is between the two thresholds, $T_a$ and $T_n$, the decision is DTX.

The threshold $T_a$ is formed by multiplying the noise standard deviation after despreading $\sigma_w$ with the norm of column vector given by channel estimates, $\|\hat{h}\|$, and the coefficient $\alpha$ that is set to fulfill the requirement on P(ACK|DTX), while $T_n = -T_a$. The column vector of channel estimates is the set of weights used in a maximum ratio combiner. Other sets of weights are also possible, e.g. weights corresponding to equal gain combining. $T_a$ is given by $$T_a = -\alpha_0 \sigma_w \|\hat{h}\| \qquad (1)$$

where P(ACK|DTX) is 0.01 for $\alpha = 1.65$.

The channel is here defined as the product of the amplitude of the transmitted pilot signal, i.e. the square root of the pilot transmission power and the complex-valued radio channel. In a fading channel, the CFAR detector can result in an unnecessarily high ACK power requirement, in order to ensure that the ACK signal is sufficiently above the average noise power. Such high required ACK power can be reduced by a dynamic threshold detector proposed by Philips, using information about the instantaneous propagation channel conditions, which are reflected in the estimated signal amplitude.

The dynamic threshold detector has a threshold $T_a$ that is proportional to the product of the noise standard deviation and the estimated signal amplitude after Rake combining $\sqrt{\Delta P_a} \|\hat{h}\|^2$:

$$T_a = -\alpha\sigma_w\sqrt{\Delta P_a}\,\|\hat{h}\|^2 \qquad (2)$$

The constant α is selected such that in average P(DTX|ACK) fulfils the target performance requirement. The value of α depends on the propagation channel, speed, antenna diversity, as well as $\Delta P_a$.

Analogously, the detector has a threshold $T_n$ that is proportional to the product of the noise standard deviation and the estimated signal amplitude after Rake combining:

$$T_n = \alpha\sigma_w\sqrt{\Delta P_n}\,\|\hat{h}\|^2 \qquad (3)$$

For both the CFAR detector and the dynamic threshold detector, in case of positive signs for ACK and negative signs for NACK, threshold $T_a$ is positive and threshold $T_n$ is negative. If a decision variable z is less than the threshold $T_n$, the decision is NACK; if a decision variable is greater than threshold $T_a$, the decision is ACK; if a decision variable is between the two thresholds, $T_n$ and $T_a$, the decision is DTX. This is shown in FIG. 1b.

There are several drawbacks with this dynamic threshold detector:

1) It is impossible to calculate α for all possible channels, speeds, etc.

2) The required power for NACK can become higher than the required power for ACK. The reason is that the required P(ACK|NACK) is much lower than the required P(NACK|ACK) because if NACK is detected as ACK, the physical layer will not detect an erroneous packet, and instead, the detection will be made in higher layers and thus cause longer delays for the retransmission. If the threshold between DTX and ACK, $T_a$, is close to the origin, the NACK power must be high to keep P(ACK|NACK) below the tight requirement.

3) The threshold depends on the product of the noise standard deviation and the estimated signal amplitude. This implies that the output of the detector depends not only on the ratio $$\sqrt{\Delta P_a}\,\|\hat{h}\|^2 / \sigma_w$$

but on the absolute values of $$\sqrt{\Delta P_a}\,\|\hat{h}\|^2$$

and $\sigma_w$.

The ACK/NACK signals are important in an ARQ scheme. To achieve a reliable ACK/NACK detection in HSDPA the transmission power is typically relatively high. If the ACK/NACK signals need to be repeated to achieve sufficient detection performance, the interference increases and the maximum data rate is decreased. An efficient detector is needed to minimize the required transmission power for ACK and NACK signals and to maximize the data rate.

SUMMARY OF THE INVENTION

The invention presents a selective threshold ACK/NACK detector and method thereof to improve performance of ACK/NACK decision.

The scheme is implemented as follows.

The inventive detection method for ACK/NACK, includes the steps of:

calculating a decision variable by integration of a despread received signal;

calculating a threshold between ACK and DTX, which includes two values, the first being proportional to a noise standard deviation after despreading the received signal, and the second depending on an estimated received signal amplitude for ACK, calculating a threshold between NACK and DTX, which includes two values, the first being proportional to a noise standard deviation after despreading the received signal, and the second depending on an estimated received signal amplitude for NACK;

selecting the one with maximum absolute value from the two calculated values of the threshold between ACK and DTX, selecting the one with maximum absolute value from the two calculated values of the threshold between NACK and DTX; and comparing the decision variable with the two selected threshold and making decision.

The inventive ACK/NACK detector includes:

a Rake combiner configured to despread and perform channel estimation of a received signal to generate a single value, which includes at least a despreader and a channel estimator, an integrator configured to integrate the single value of one slot and accumulate the integrated results of each of N slots to obtain a decision variable, a comparator configured to compare the decision variable from the integrator with a threshold between ACK and DTX and a threshold between NACK and DTX given from a means for generating thresholds, respectively, and a noise estimator for performing estimation of despread signal from the despreader to obtain a noise standard deviation after dispreading.

A threshold generator is used for calculating a threshold between ACK and DTX that includes two values, the first being proportional to a noise standard deviation from the noise estimator, and the second depending on an estimated received signal amplitude for ACK. The calculating means calculates a threshold between NACK and DTX that includes two values, the first being proportional to a noise standard from the noise estimator, and the second depending on an estimated received signal amplitude for NACK, selects the one with maximum absolute value from the two calculated values of the threshold between ACK and DTX, and selects the one with maximum absolute value from the two calculated values of the threshold between NACK and DTX.

The Rake combiner may be a maximum ratio combiner.

With the inventive selective threshold detector and associated method, the required transmission power for ACK and NACK signals is decreased while the target performance requirements on the physical layer outlined in the 3GPP are met. Because the transmission power for ACK and NACK signals is decreased, interference is decreased and data rate is improved.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

The CFAR detector previously described ensures a constant probability of false alarm. However, the probability of missed detection, P(DTX|ACK), varies with the instantaneous SNR(signal-to-noise ratio). Since knowledge about the instantaneous SNR is not used in the transmitter, the ACK power may be unnecessarily high to achieve the required probability of missed detection.

The dynamic threshold detector previously described utilizes information about the expected received signal power obtained from known power offsets and the channel estimation. However, this detector has several problems as stated in the foregoing disclosure.

To ensure that P(ACK|NACK) is not higher than its strict requirement, the present invention introduces a noise-level dependent threshold. In the relatively few cases when the absolute value of the dynamic threshold is lower than the absolute value of the noise-level dependent threshold, the latter threshold is selected. This limitation of the thresholds efficiently reduces P(ACK|NACK) and P(NACK|ACK) with only a small impact on P(DTX|ACK) and P(DTX|NACK).

The invention uses all the available information in the HSDPA air-interface that may help in detection of ACK/NACK, and at the same time combines it with information about the noise level in the receiver. Namely, because the channel coefficients and the ACK/NACK power offsets are known to the receiver, the expected received signal amplitudes of ACK and NACK are known in the receiver.

Because in HSDPA the ACK sign is negative and NACK sign is positive, the invention selects the threshold between ACK and DTX from the minimum of two values, the first being proportional to the noise standard deviation after despreading, and the second being proportional to the estimated received signal amplitude. The maximum of two values, the first being proportional to the noise standard deviation after despreading, and the second being proportional to the estimated received signal amplitude, is selected as the threshold between NACK and DTX.

Figure 1A:
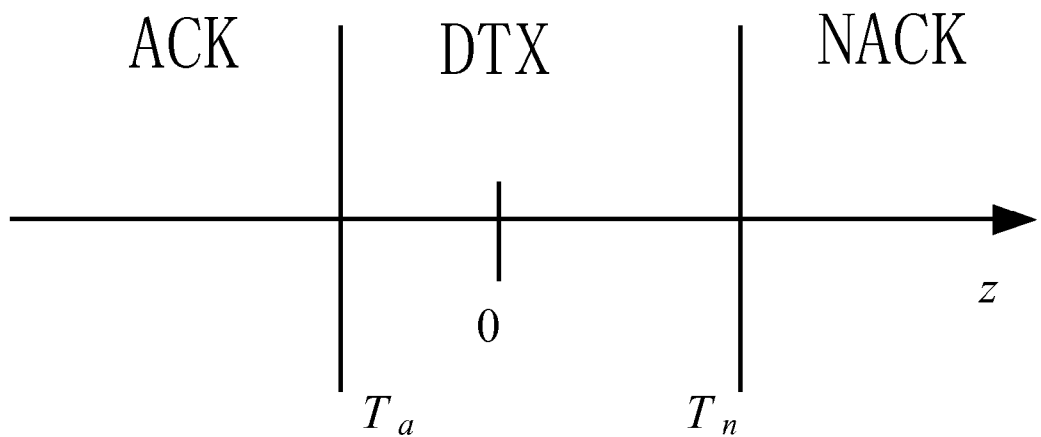
FIGS. 1a and 1b illustrate decision regions for the CFAR detector of the prior art.
Figure 1B:
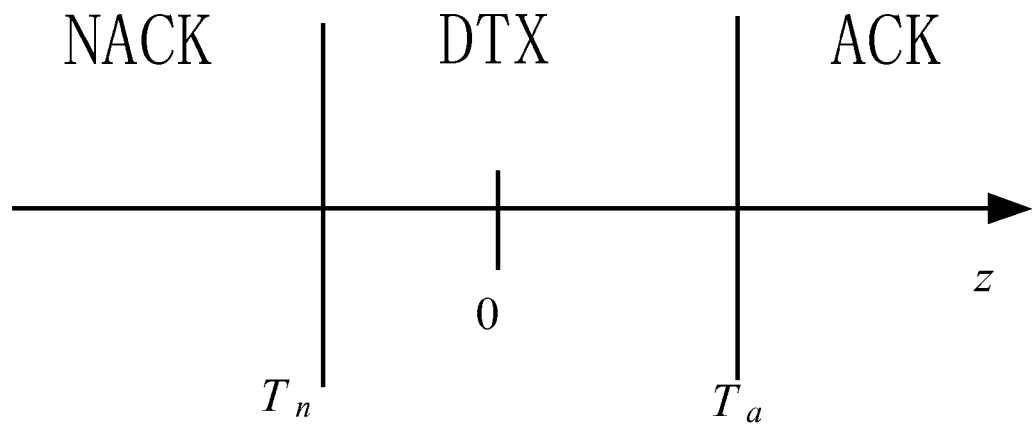

Contrarily, in case of in a system with reversed signs for ACK and NACK, i.e. positive for ACK and negative for NACK, the threshold between ACK and DTX should be selected as the maximum of two thresholds, and the threshold between NACK and DTX should be selected as the minimum of two thresholds. The decision criterion is same as which in FIG. 1b.

In HSDPA the ACK/NACK signal is a 1-bit message repetition coded to 10 bits giving the code Words "ACK": 1111111111 and "NACK": 0000000000.

After the usual mapping $0 \rightarrow +1$ and $1 \rightarrow -1$, it is clear that ACK and NACK are antipodal signals, where ACK has a negative sign and NACK has a positive sign. Hence, the decision variable z should be obtained by integration of despread ACK/NACK bits. The ACK/NACK transmissions are performed in the first time slot of three in a subframe, and should be repeated in N consecutive subframes where N is a parameter set by the network.

Figure 2:
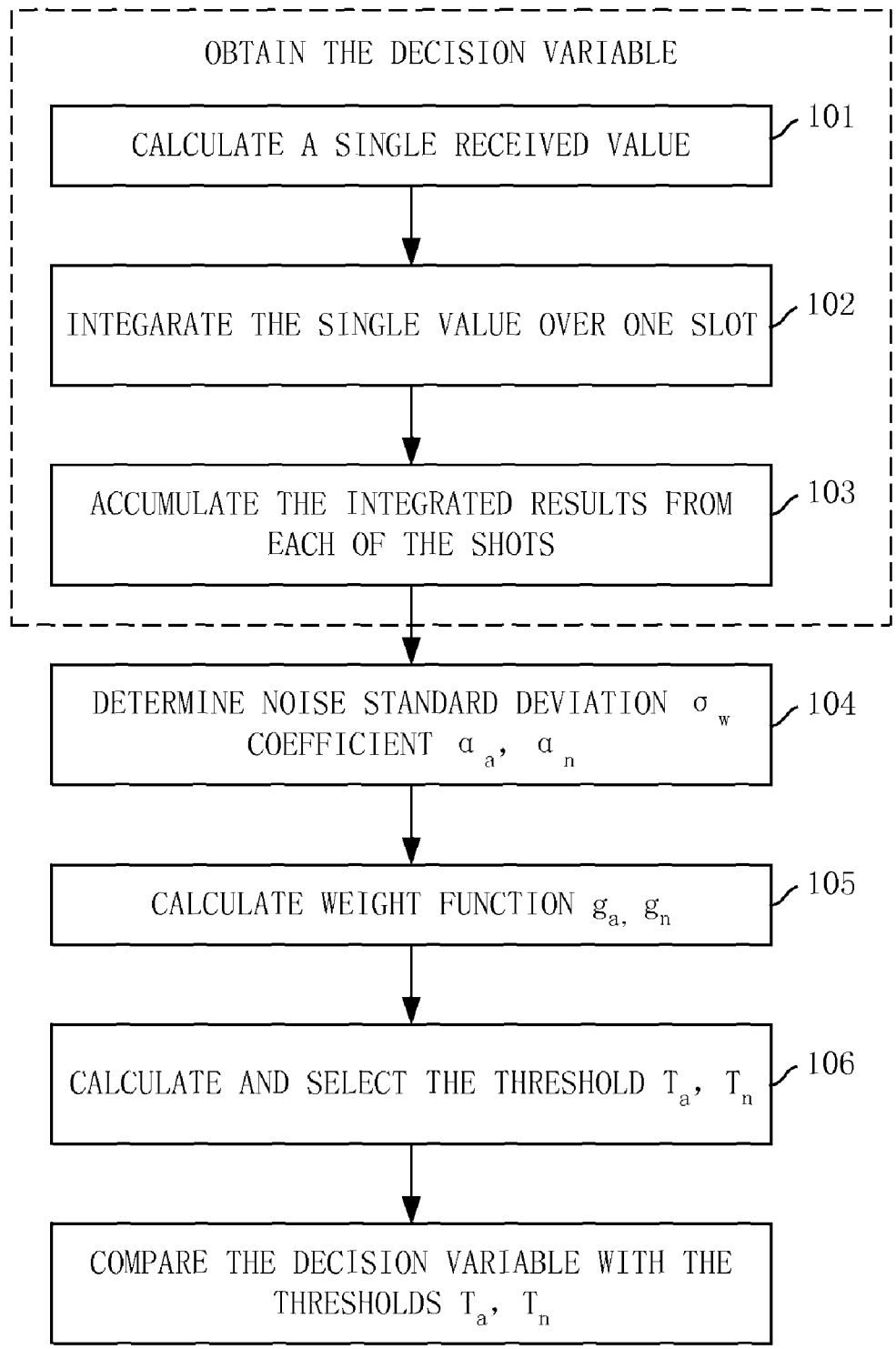
FIG. 2 shows the detection method for ACK/NACK of the invention.

Referring to the FIG. 2, the selective threshold ACK/NACK detection method includes: calculating the decision variable z by integration of despread ACK/NACK values received (101, 102, and 103);

estimating a noise standard deviation after despreading the received signals (104);

generating a weight function by means of channel estimates and the noise standard deviation;

wherein the weight function includes a first weight function for ACK and a second NACK weight function for NACK (105);

generating the first threshold between ACK and DTX, $T_{a,1}$, using the noise standard deviation and norm of column vectors given by channel estimates, and the second threshold between ACK and DTX, $T_{a,2}$, using the power offset for the ACK transmission and the first weight function (106);

generating the first threshold between NACK and DTX, $T_{n,1}$, using the noise standard deviation and norm of column vectors given by channel estimates, and the second threshold between NACK and DTX, $T_{n,2}$, using the power offset for the NACK transmission and the second weight function (106);

selecting minimum of two values, first threshold $T_{a,1}$ and the second threshold $T_{a,2}$, and at the same time selecting maximum of two values, first threshold $T_{n,1}$ and the second threshold $T_{n,2}$ (106); and comparing the decision variable with the selected $T_a$ and $T_n$. If the decision variable is less than the threshold $T_a$, the decision is ACK; if the decision variable is greater than threshold $T_n$, the decision is NACK; if the decision variable is between the two threshold, $T_a$ and $T_n$, the decision is DTX.

Regarding the decision variable, it can be calculated as follows:

Step 101, a single ACK/NACK value, $z_i^{(n)}$, is obtained at the output of the Rake maximum ratio combiner and can be described as $$z_i^{(n)} = G \left\{ \sum_{l=1}^{L} h_{il}^{n*} s_{il}^n \right\}, \tag{4}$$

where L is the number of Rake fingers, and $s_{il}^n$ is the despread value of the lth finger at the ith symbol of the nth transmission of the ACK/NACK and $h_{il}^n$ is the corresponding channel estimate. The symbol * denotes complex conjugate. $G\{\cdot\}$ takes the real part or the imaginary part depending on whether the ACK/NACK signal is mapped on the in-phase (I) or quadrature phase (Q) component of the uplink signal.

Step 102, the integration of ACK/NACK value over one slot can be described as $$z^{(n)} = \sum_{i=1}^{10} z_i^{(n)} \tag{5}$$

Step 103, the real-valued decision variable, z, is then obtained from accumulating the integrated results of each of the N slots, i.e.

$$z = \sum_{n=1}^{N} z^{(n)} = G\{\hat{h}^H s\} \quad (6)$$

where $\hat{h}$ and s are column vectors with 10LN elements given by the channel estimates $\hat{h}_{il}{}^n$ and the despread symbols $s_{il}{}^n$, respectively.

The noise standard deviation after despreading, $\sigma_w$, are given as follows:

Step 104, the noise standard deviation after despreading, $\sigma_w$, is obtained from the following relation: The despread values, s, can be expressed as $$s = \gamma h \sqrt{\Delta P} x + w, \quad (7)$$

where h is the vector of actual channel coefficients, $\Delta P$ takes the values $\Delta P_a$ and $\Delta P_n$ defined by the network for ACK and NACK, respectively, w is a vector of complex noise samples with standard deviation $\sigma_w$. x is the transmitted symbol, which takes the value $-1$, 0, and 1 for ACK, DTX, and NACK, respectively. Finally, $\gamma$ is either one or the imaginary unit j depending on whether the ACK/NACK signal is mapped on I or Q. The noise standard deviation $\sigma_w$ can be obtained e.g. from the despread values, s.

In applications the channel estimation is not ideal. The expected received signal amplitude after Rake maximum ratio combining is therefore $$\sqrt{\Delta P} \hat{h}^H E(h|\hat{h})$$

instead of $$\sqrt{\Delta P} \hat{h}^H h$$

as for ideal channel estimation. Often the channel estimation error can be considered to be zero-mean and Gaussian. Then the channel estimate $\hat{h}$ is given by $$\hat{h} = h + \epsilon, \quad (9)$$

where $\epsilon$ has variance $\sigma_{\epsilon_k}^2$ for element k.

Regarding to the first weight function and the second weight function, it can be generated as follows.

In Step 105 of FIG. 2, weight function g is given by $$g(\hat{h}) = \frac{\sigma_0}{\sigma_0 + \sigma_1} \hat{h}^H E(h|\hat{h}), \quad (10)$$

and $$\sigma_0^2 = \frac{1}{2} \sigma_w^2 \|\hat{h}\|^2 \quad (11)$$

-continued $$\sigma_1^2 = \sigma_0^2 + \Delta P \mathrm{Var}\big(Re\{\hat{h}^H h\} \big| \hat{h}\big), \quad (12)$$

where $\|\cdot\|$ denotes the vector norm: $\|\hat{h}\|^2 = \hat{h}^H \hat{h}$. When $\Delta P$ is the power offset for the ACK signal received, the weight function g corresponds to the first weight function; similarly, the weight function g corresponds to the second weight function when $\Delta P$ is the power offset for the NACK signal received. The power offset is known in the receiver.

In the limit of ideal channel estimation, $g(\hat{h}) = 0.5\|\hat{h}\|^2$.

The conditional probability distribution of h given $\hat{h}$ depends on the distribution of h. In mobile communication systems the multipath components are in many cases Rayleigh fading. Then it can be shown that $(h|\hat{h})$ is Gaussian and its mean $E(h|\hat{h})$ $$E(h|\hat{h}) = A\hat{h}, \quad (13)$$

where A is a diagonal matrix and its kth diagonal element is given by $$(A)_{kk} = \frac{E\{|h_k|^2\}}{E\{|h_k|^2\} + \sigma_{\epsilon_k}^2}. \quad (14)$$

where $h_k$ is the kth element of h, | | denotes absolute value, and $\sigma_{\epsilon_k}^2$ is the variance of the channel estimate error for Rake finger k.

The variance of $(\hat{h}^H h|\hat{h})$ is given by $$\mathrm{Var}(Re\{\hat{h}^H h\}|\hat{h}) = \tfrac{1}{2} \hat{h}^H B \hat{h}, \ B = bCb^H$$

where B is the covariance matrix of $(h|\hat{h})$, b is a column vector with its kth element given by $$b_k = \sqrt{\frac{E\{|h_k|^2\}\sigma_{\epsilon_k}^2}{E\{|h_k|^2\} + \sigma_{\epsilon_k}^2}}, \ k = 1, 2, \ldots, 10LN \quad (15)$$

and C is the matrix of correlation coefficients. Its element on row i and column k, $[C]_{ik}$, is the correlation coefficient between $(h_i|\hat{h})$ and $(h_k|\hat{h})$. The correlation coefficient $\rho$ between the random variables X and Y is defined by $$\rho = \frac{\mathrm{Cov}(X, Y)}{\sqrt{\mathrm{Var}(X)\mathrm{Var}(Y)}}. \quad (16)$$

Typically, $[C]_{ik}$ is close to one if the indices i and k refer to the same path in the same slot and zero if the indices refer to different paths. The channel estimation error variances $\sigma_{\epsilon_k}^2$ can e.g., be calculated from knowledge of the noise power and the channel estimation filter coefficients. The mean pilot signal power received in Rake finger k, $E\{|h_k|^2\}$, can be obtained by averaging $|\hat{h}_k|^2 - \sigma_{\epsilon_k}^2$ over a time that is much longer than the correlation time of the channel.

In Step 106 of FIG. 2, regarding the threshold between ACK and DTX, $T_a$, and the threshold between NACK and DTX, $T_n$, they can be given as following equations using the foregoing obtained results:

$$T_a = \min\{-\alpha_a \sigma_w \|\hat{h}\|, -\sqrt{\Delta P_a}\, g_a(\hat{h})\} \quad (17)$$

$$T_n = \max\{\alpha_n \sigma_w \|\hat{h}\|, \sqrt{\Delta P_n}\, g_n(\hat{h})\} \quad (18)$$

where the coefficient $\alpha_n$ is typically equal to $\alpha_a$. $\alpha_a$ should be smaller than the coefficient $\alpha_0$ in equation (1) to allow $T_a$ to be both larger and smaller than in the CFAR detector.

Figure 3:
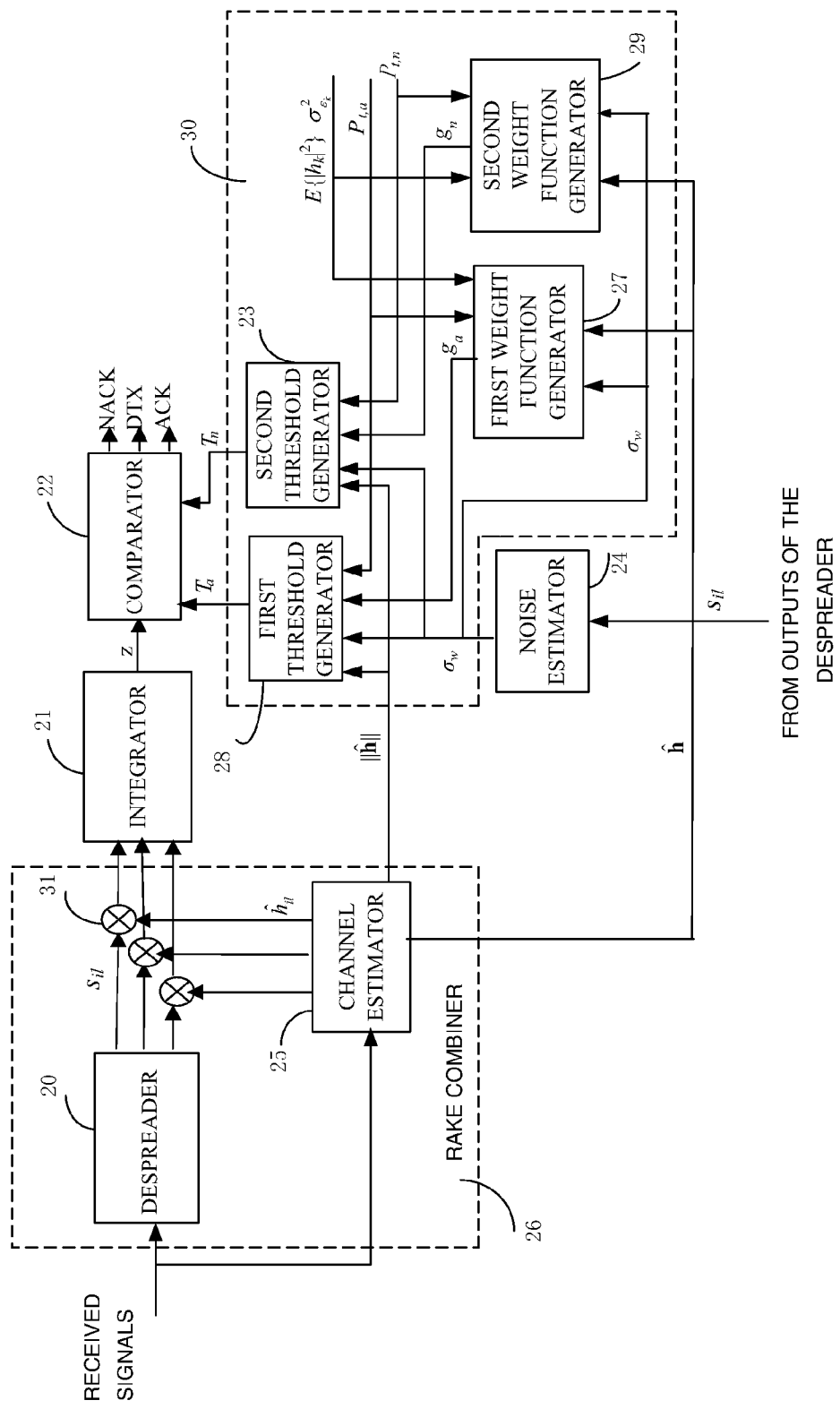
FIG. 3 shows a selective threshold detector for ACK/NACK of the invention.

Referring to FIG. 3, a selective ACK/NACK threshold detector according to the present invention is shown. The detector includes a Rake combiner 26 including a despreader 20, a multiplier 31 and channel estimator 25; an integrator 21, a comparator 22, a noise estimator 24 and a threshold generator unit 30. The threshold generator unit 30 includes a first threshold generator 28, a first weight function generator 27, a second threshold generator 23 and a second weight function generator 29.

The rake combiner 26 receives the signals from MSs, and then gives a single value $z_i$; the integrator 21 accumulates the single value $z_i$ from the rake combiner 26 to obtain values over one slot, and then accumulates the obtained values of each of the N slots to obtain a decision variable z. In other words, the integrator 21 calculates the decision variable z according to equations 4, 5, 6.

The noise estimator 24 estimates noise standard deviation after despreading, $\sigma_w$, on the basis of the outputs of the despreader 20 and then sends to the first threshold generator 28, the second threshold generator 23, the first weight function generator 27 and the second weight function generator 29, respectively. In view of the foregoing description, the noise estimation can be based on the output of the despreader (20), but there are also other options.

The channel estimator 25 generates the norm of column vectors given by channel estimates to the first threshold generator 28, and the second threshold generator 23, respectively. At the same time the channel estimator 25 gives channel estimates to the first weight function generator 27 and the second weight function generator 29, respectively.

The power offset for the ACK signal, $\Delta P_a$, and the power offset for the NACK signal, $\Delta P_n$, are sent to the first weight function generator 27 and the second weight function generator 29, respectively. The variance of the channel estimate for Rake finger k, $\sigma_{\epsilon_k}^2$, and the mean received pilot signal power in Rake finger k, $E\{|h_k|^2\}$, are sent to both weight function generators, 27, 29.

According to equations 10 to 16, the first weight function generator 27 generates a first weight function, $g_a(\hat{h})$, using the noise standard deviation after despreading $\sigma_w$ from noise estimator 24, the norm of column vectors given by channel estimates from channel estimator 25, and the known power offset for ACK, and then gives to the first threshold generator 28. Similarly, the second weight function generator 29 generates the second weight function, $g_n(\hat{h})$, and gives to the second threshold generator 23.

According to equation 17, the first threshold generator 28 generates the first threshold $T_{a,1}$ using the norm of column vectors given by channel estimates from the channel estimator 25, the noise standard deviation after despreading $\sigma_w$ from the noise estimator 24, and generates the second threshold $T_{a,2}$ using the first weight function from the first weight function generator 27 and a known power offset for ACK, then selects the minimal one from the $T_{a,1}$ and $T_{a,2}$ and sends to the comparator 22. Similarly, according to equation 18, the second threshold generator 23 generates first threshold $T_{n,1}$ using the norm of column vectors given by channel estimates from the channel estimator 25, the noise standard deviation after despreading $\sigma_w$ from the noise estimator 24, and generates the second threshold $T_{n,2}$ using the second weight function from the second weight function generator 29 and a known power offset for NACK in the receiver, then selects the maximal one from the $T_{n,1}$ and $T_{n,2}$ and sends to the comparator 22.

The comparator 22 compares the decision variable from the integrator 21 with the two thresholds, $T_a$ and $T_n$, from the threshold generators 28 and 23, respectively. If a decision variable is less than the threshold $T_a$, the comparator 22 gives a decision of ACK; if a decision variable is greater than threshold $T_n$, the comparator 22 gives a decision of NACK; if a decision variable is between the two thresholds, $T_a$ and $T_n$, a decision of DTX is given by the comparator 22.

The detector has been evaluated by simulations. The required Ec/No for the ACK/NACK bits to fulfill the target performance requirements $P(ACK|DTX) \leq 0.01$, $P(DTX|ACK) \leq 0.01$ and $P(ACK|NACK) \leq 0.0001$ have been calculated. Ec is defined as the total received energy per chip on each diversity antenna. The simulations have been performed for different propagation channels.

TABLE 2

Required Ec/No for $P(ACK|DTX) <0.01$, $P(DTX|ACK) <0.01$, and $P(ACK|NACK) <0.0001$

| | | Required Ec/No for ACK/NACK(dB) Detector | | |
|---|---|---|---|---|
| | Propagation channel | CFAR detector: $\alpha_0 = 1.65$ | Dynamic threshold detector: $\alpha = 1.29$ | Selective threshold detector: $\alpha_a = 0.99$, $g_a(\hat{h}) = 0.5\|\hat{h}\|^2$ |
| A | Ped. A 30 km/h, no div. | −6.4/−20.3 | −10.0/−7.6 | −8.8/−12.0 |
| B | Ped. A 30 km/h | −14.6/−27.2 | −12.8/−27.1 | −16.6/−20.9 |
| C | Case 1 | −16.1/−28.5 | −12.9/−∞ | −17.7/−22.9 |
| D | Case 2 | −18.7/−30.2 | −13.5/−∞ | −19.6/−26.6 |
| E | Case 3 | −18.8/−30.2 | −13.5/−∞ | −19.6/−26.9 |

The simulation results are shown in Table 2 for ideal channel estimation. The coefficient $\alpha$ has been optimized for simulation case A and is kept constant for all cases since it is impossible to optimize it for all propagation channels, speeds etc. All coefficients used to determine $T_a$ for the three detectors are given in the table.

Let the maximum required power be defined as the larger of the required powers for either ACK or NACK transmissions. Then it is clear from Table 2 that the new selective threshold detector has lower maximum required power than prior art, both the CFAR detector and the dynamic threshold detector, in all simulated cases.

The invention for ACK/NACK detection is not restricted to HSDPA but can be applied to any system using ACK/NACK signalling with antipodal signals, known channel estimates and power offsets of ACK/NACK to the pilot signal power. It is within the scope of the present invention to include all foreseeable equivalents to the elements and structure as described with reference to FIGS. 2 and 3.

The invention claimed is:

1. A detection method for ACK/NACK signals, comprising the steps of
   a. calculating a decision variable by integration of a despread received signal;
   b. calculating four values, the first being proportional to a noise standard deviation after despreading the received signal, and the second depending on an estimated received signal for ACK, the third being proportional to a noise standard deviation after despreading the received signal, and the fourth depending on an estimated received signal for NACK;

c. selecting the one with maximum absolute value from the first and second values as the threshold between ACK and DTX, and selecting the one with maximum absolute value from third and fourth values of the threshold between NACK and DTX; and d. comparing the decision variable with the two selected thresholds and making decision.

2. The detection method according to claim 1, wherein in step b, a fourth value depending on an estimated received signal for ACK is calculated by weighting the square root of a power offset of ACK with a first weight function; and a second value depending on an estimated received signal for NACK is calculated by weighting the square root of a power offset of NACK with a second weight function.

3. The detection method according to claim 2, wherein the weighting of the square root of the power offset of ACK with a first weight function is calculated as:

$$-\sqrt{\Delta P_a}\, g_a(\hat{h}),$$

where $\Delta P_a$ represents the power offset for the ACK and $g_a(\hat{h})$ represents the first weight function, when the ACK signal is mapped to negative sign; and the weighting the square root of the power offset of NACK with a second weight function is calculated as:

$$\sqrt{\Delta P_n}\, g_n(\hat{h}),$$

where $\Delta P_n$ represents the power offset for the NACK and $g_n(\hat{h})$ represents the second weight function, when the NACK signal is mapped to positive sign.

4. The detection method according to claim 3, wherein the weight function is given as:

$$g(\hat{h}) = \frac{\sigma_0}{\sigma_0 + \sigma_1} \hat{h}^H E(h|\hat{h})$$

where $$\sigma_0^2 = \frac{1}{2}\sigma_w^2 \|\hat{h}\|^2,$$

and $\sigma_1^2 = \sigma_0^{2+\Delta P Var(Re\{\hat{h}^H h\}|\hat{h})}$, wherein $\sigma_w$ denotes the noise standard deviation after despreading, $\|\cdot\|$ denotes the vector norm: $\|\hat{h}\|^2 = \hat{h}^H \hat{h}$, $\hat{h}$ are column vectors given by the channel estimates, and $E(h|\hat{h})$ represents mean of the conditional probability distribution of h given $\hat{h}$ in case of Rayleigh fading, and the $E(h|\hat{h})$ is calculated as: $E(h|\hat{h}) = A\hat{h}$, where A is a diagonal matrix and its kth diagonal element is given by $$(A)_{kk} = \frac{E\{|h_k|^2\}}{E\{|h_k|^2\} + \sigma_{\varepsilon_k}^2}$$

wherein $h_k$ is the kth element of h, $|\cdot|$ denotes absolute value, and $\sigma_{\varepsilon_k}^2$ is the variance of the channel estimate error for Rake finger k, $E\{|h_k|^2\}$ is the mean pilot signal power received by Rake finger k, and when $\Delta P = \Delta P_a$, $g(\hat{h}) = g_a(\hat{h})$;
when $\Delta P = \Delta P_n$, $g(\hat{h}) = g_n(\hat{h})$.

5. The detection method according to claim 2, wherein the weight function is given as:

$$g(\hat{h}) = \frac{\sigma_0}{\sigma_0 + \sigma_1} \hat{h}^H E(h|\hat{h})$$

where $$\sigma_0^2 = \frac{1}{2}\sigma_w^2 \|\hat{h}\|^2,$$

and $\sigma_1^2 = \sigma_0^2 + \Delta P Var(Re\{\hat{h}^H h\}|\hat{h})$, wherein $\sigma_w$ denotes the noise standard deviation after despreading, $\|\cdot\|$ denotes the vector norm: $\|\hat{h}\|^2 = \hat{h}^H \hat{h}$, $\hat{h}$ are column vectors given by the channel estimates, and $E(h|\hat{h})$ represents mean of the conditional probability distribution of h given $\hat{h}$ in case of Rayleigh fading, and the $E(h|\hat{h})$ is calculated as: $E(h|\hat{h}) = A\hat{h}$, where A is a diagonal matrix and its kth diagonal element is given by $$(A)_{kk} = \frac{E\{|h_k|^2\}}{E\{|h_k|^2\} + \sigma_{\varepsilon_k}^2}$$

wherein $h_k$ is the kth element of h, $|\cdot|$ denotes absolute value, and $\sigma_{\varepsilon_k}^2$ is the variance of the channel estimate error for Rake finger k, $E\{|h_k|^2\}$ is the mean pilot signal power received by Rake finger k, and when $\Delta P = \Delta P_a$, $g(\hat{h}) = g_a(\hat{h})$;
when $\Delta P = \Delta P_n$, $g(\hat{h}) = g_n(\hat{h})$.

6. The detection method according to claim 1, wherein step b further includes calculating, the threshold between ACK and DTX, when the ACK signal is mapped to a negative sign, a first value proportional to a noise standard deviation after despreading is given as: $-\alpha_a \sigma_w \|\hat{h}\|$; and wherein step b further includes calculating, the threshold between NACK and DTX, when the NACK signal is mapped to positive sign, the first value being proportional to a noise standard deviation after despreading is given as: $\alpha_n \sigma_w \|\hat{h}\|$;

wherein the coefficients $\alpha_a$ and $\alpha_n$ meet a target performance requirement.

7. An ACK/NACK detector comprising:

a Rake combiner configured to despread and perform channel estimation of a received signal to generate a single value, which includes at least a despreader and a channel estimator, an integrator configured to integrate the single value of one slot and accumulate the integrated results of each of N slots to obtain a decision variable, a comparator configured to compare the decision variable from the integrator with a threshold between ACK and DTX and a threshold between NACK and DTX given from a threshold generating unit, respectively, a noise estimator configured to perform estimation of despread signals from the despreader to obtain a noise standard deviation after despreading, wherein the threshold generating unit, is adapted for calculating four values, the first being proportional to a noise standard deviation after despreading the received signal, and the depending on an estimated received signal for ACK, the third being proportional to a noise standard after despreading the received signal, and the fourth depending on an estimated received signal for NACK, and selecting the one with maximum absolute value from the first and second values as the threshold between ACK and DTX, and selecting the one with maximum absolute value from the third and fourth values of the threshold between NACK and DTX.

8. The ACK/NACK detector according to claim 7, wherein the threshold generating unit comprises, a first weight function generator configured to generate a first weight function by using the channel estimates from the Rake combiner, the noise standard deviation from the noise estimator, a known power offset of the ACK, estimated channel estimation error variances and an estimated mean of the received pilot signal powers;

a first threshold generator configured to generate the first value by using norm of the channel estimates from the Rake combiner and the noise standard deviation from the noise estimator, generate the second value by weighting the square root of a power offset of the ACK with the first weight function from the first weight function generator, and give the one with maximum absolute value to the comparator;

a second weight function generator configured to generate a second weight function by using the channel estimates from the Rake combiner, the noise standard deviation from the noise estimator, a known power offset of the NACK, the estimated channel estimation error variances and the estimated mean of the received pilot signal powers; and a second threshold generator configured to generate the first value by using norm of the channel estimates from the Rake combiner and the noise standard deviation from the noise estimator, generate the second value by weighting the square root of a power offset of the NACK with the second weight function from the second weight function generator, and give the one with maximum absolute value to the comparator.

9. The ACK/NACK detector according to claim 8, wherein when the ACK signal is mapped to negative sign, the first threshold generator generates the first value being proportional to a noise standard deviation after despreading as: $-\alpha_a \sigma_w \|\hat{h}\|$;

when the NACK signal is mapped to positive sign, the second threshold generator generates the first value being proportional to a noise standard deviation after despreading is given as: $\alpha_n \sigma_w \|\hat{h}\|$;

wherein the coefficients $\alpha_a$, and $\alpha_n$ meet a target performance requirement.

10. The ACK/NACK detector according to claim 9, wherein the first threshold generator generates the second value given as the following:

$$-\sqrt{\Delta P_a}\, g_a(\hat{h}), \text{ where } \Delta P_a$$

represents the known power offset for the ACK and $g_a(\hat{h})$ represents the first weight function when the ACK signal is mapped to negative sign; and the second threshold generator generates the second value given as the following:

$$\sqrt{\Delta P_n}\, g_n(\hat{h}),$$

where $\Delta P_n$, represents the known power offset for the NACK and $g_n(\hat{h})$ represents the second weight function when the NACK signal is mapped to positive sign.

11. The ACK/NACK detector according to claim 8, wherein the first threshold generator generates the second value given as the following:

$$-\sqrt{\Delta P_a}\, g_a(\hat{h}), \text{ where } \Delta P_a$$

represents the known power offset for the ACK and $g_a(\hat{h})$ represents the first weight function when the ACK signal is mapped to negative sign; and the second threshold generator generates the second value given as the following:

$$\sqrt{\Delta P_n}\, g_n(\hat{h}),$$

where $\Delta P_n$ represents the known power offset for the NACK and $g_n(\hat{h})$ represents the second weight function when the NACK signal is mapped to positive sign.

12. The ACK/NACK detector according to claim 8, wherein the first weight function generator generates the first weight function given as:

$$g(\hat{h}) = \frac{\sigma_0}{\sigma_0 + \sigma_1} \hat{h}^H E(h \mid \hat{h})$$

where $$\sigma_0^2 = \frac{1}{2}\sigma_w^2 \|\hat{h}\|^2,$$

$\sigma_1^2 = \sigma_0^2 + \Delta P_a \operatorname{Var}(\operatorname{Re}\{\hat{h}^H h\} \mid \hat{h})$, and the second weight function generator generates the second weight function given as:

$$g(\hat{h}) = \frac{\sigma_0}{\sigma_0 + \sigma_1} \hat{h}^H E(h \mid \hat{h})$$

where $\sigma_0^2 = \frac{1}{2}\sigma_w^2\|\hat{h}\|^2$, $\sigma_1^2 = \sigma_0^2 + \Delta P_n \mathrm{Var}\left(\mathrm{Re}\left\{\hat{h}^H h\right\} \Big| \hat{h}\right)$, wherein $\sigma_w$ denotes the noise standard deviation after despreading, $\|\bullet\|$ denotes the vector norm: $\|\hat{h}\|^2 = \hat{h}^H \hat{h}$, $\hat{h}$ are column vectors given by the channel estimates, and $E(h|\hat{h})$ represents mean of the conditional probability distribution of h given $\hat{h}$ in case of Rayleigh fading; and $E(h|\hat{h})$ is calculated as: $E(h|\hat{h})=A\hat{h}$, where A is a diagonal matrix and its kth diagonal element is given by $$(A)_{kk} = \frac{E\{|h_k|^2\}}{E\{|h_k|^2\} + \sigma_{\varepsilon_k}^2}$$

wherein $h_k$ is the kth element of h, $|\bullet|$ denotes absolute value, $\sigma_{\varepsilon_k}^2$ is the variance of the channel estimate error for Rake finger k, $E\{|h_k|^2\}$ is the mean pilot signal power received in Rake finger k.

* * * * *

UNITED STATES PATENT AND TRADEMARK OFFICE
CERTIFICATE OF CORRECTION

PATENT NO. : 7,770,086 B2
APPLICATION NO. : 12/045084
DATED : August 3, 2010
INVENTOR(S) : Mauritz et al.

It is certified that error appears in the above-identified patent and that said Letters Patent is hereby corrected as shown below:

In Col. 11, line 45, claim 4, delete "claim 3" and insert --claim 2--.
In Col. 12, line 13, claim 5, delete "claim 2" and insert --claim 3--.
In Col. 13, line 65, claim 10, delete "claim 9" and insert --claim 8--.
In Col. 14, line 18, claim 10, delete "$\Delta P_n$," and insert --$\Delta P_n$--.
In Col. 14, line 21, claim 11, delete "claim 8" and insert --claim 9--.

Signed and Sealed this

Twenty-third Day of November, 2010

David J. Kappos
*Director of the United States Patent and Trademark Office*